United States Patent [19]
Trees

[11] 3,835,739
[45] Sept. 17, 1974

[54] MACHINING APPARATUS
[75] Inventor: James C. Trees, Sterling Heights, Mich.
[73] Assignee: LaSalle Machine Tool, Inc., Warren, Mich.
[22] Filed: June 15, 1973
[21] Appl. No.: 370,474

[52] U.S. Cl............................ 82/20, 82/2 E, 82/18
[51] Int. Cl......... B23b 5/00, B23b 3/00, B23b 3/28
[58] Field of Search..................... 82/2 E, 11, 18, 20

[56] References Cited
UNITED STATES PATENTS

| | | | |
|---|---|---|---|
| 2,039,646 | 5/1936 | Hoisington et al. | 82/2 E X |
| 2,383,050 | 8/1945 | Esson | 82/2 E X |
| 2,395,121 | 2/1946 | Hodges et al. | 82/2 E |
| 2,604,690 | 7/1952 | Rodder et al. | 82/20 X |
| 2,720,806 | 10/1955 | Stewart | 82/20 |
| 2,762,250 | 9/1956 | Auman et al. | 82/18 |
| 3,103,140 | 9/1963 | Connelley | 82/2 E |
| 3,391,586 | 7/1968 | Keiboom | 82/18 |

Primary Examiner—Harrison L. Hinson

[57] ABSTRACT

Apparatus for machining parts, such as pistons, comprising a main spindle having an axis, a tool holding head movably mounted on one end of the spindle, a plurality of tools mounted in a circular formation on the head at positions spaced radially outwardly from the axis and a cross slide for moving the head transversely of the axis so that the tools thereon are movable between concentric and eccentric positions relative to the spindle axis. When the tools are in their concentric positions, a workpiece can be centered on the spindle axis in a clearance relation with the tools. When the cross slide is actuated to move the tool head toward the eccentric position, one of the tools is moved into machining engagement with the workpiece. The tool head is rotatable on the spindle to index the tools and is readily removable from the spindle for tool replacement purposes.

13 Claims, 3 Drawing Figures

3,835,739

MACHINING APPARATUS

BACKGROUND OF THE INVENTION

It is often desirable in machining parts to have ready and quick access to a plurality of different tools at the same work station. This may be necessitated, for example, by circumstances which cause the tools to wear out rapidly. In these circumstances, the capability for indexing successive tools into work position at a single station results in a dramatic decrease of machine shutdown time for tool replacement purposes. In cases where different tools are provided at the same station for performing different machining operations on a single workpiece, the capability of the machine tool to rapidly index different tools into work position reduces the number of stations and thus the size and complexity of the machinery required. It is desirable, therefore, to provide a machine tool assembly in which a plurality of indexable tools are provided at a single station and which do not interfere with movement of the workpieces into and out of positions to be machined.

SUMMARY OF THE INVENTION

The machining apparatus of this invention comprises a main spindle having an axis, a feed spindle mounted coaxially within the main spindle and an index spindle mounted coaxially within the feed spindle. A cross slide assembly, secured to the main spindle, includes a cross slide member movable transversely of the spindle axis. A clutch is provided for mounting an index body on the cross slide assembly so that the body can be moved transversely of the spindle axis by the cross slide member but the index body can also be rotated relative to the cross slide assembly when desired. A tool head is removably mounted on the index body so that it can be removed for tool replacement purposes. A plurality of tools are mounted on the tool head and arranged in a circular formation.

The feed spindle and the cross slide member are connected so that in response to axial movement of the feed spindle, the cross slide member is movable transversely of the spindle axis. Such movement results in movement of the tools on the tool head in a direction transversely of the spindle axis. As a result, the tools are movable between positions in which they are in paths concentric and eccentric with respect to the spindle axis. When the tools are in their concentric positions, a workpiece is movable into a coaxial relation with respect to the spindle axis to a position within the circular tool formation and in a clearance relation with the tools. Subsequently, movement of the feed spindle is operable, through the cross slide member, to move the tools to eccentric positions in which one of the tools is progressively moved into machining engagement with the workpiece to accomplish the desired machining. The cross slide member is moved in a reverse direction to return the tools to concentric positions for removal of the finished workpiece.

When a tool becomes worn, the index spindle is moved into operative engagement with the indexing body and actuated to rotate the index body relative to the cross slide assembly to move another tool into the position previously occupied by the worn tool. Such movement is permitted by virtue of the clutch mounting of the index body on the cross slide assembly. The above-described machining operations can then be repeated utilizing the new tool.

Thus, the machining apparatus of this invention provides a readily indexable tool assembly in which successive tools are readily movable into machining engagement with workpieces.

Further objects, features and advantages of this invention will become apparent from a consideration of the following description, the appended claims, and the accompanying drawing in which:

Figure 1:
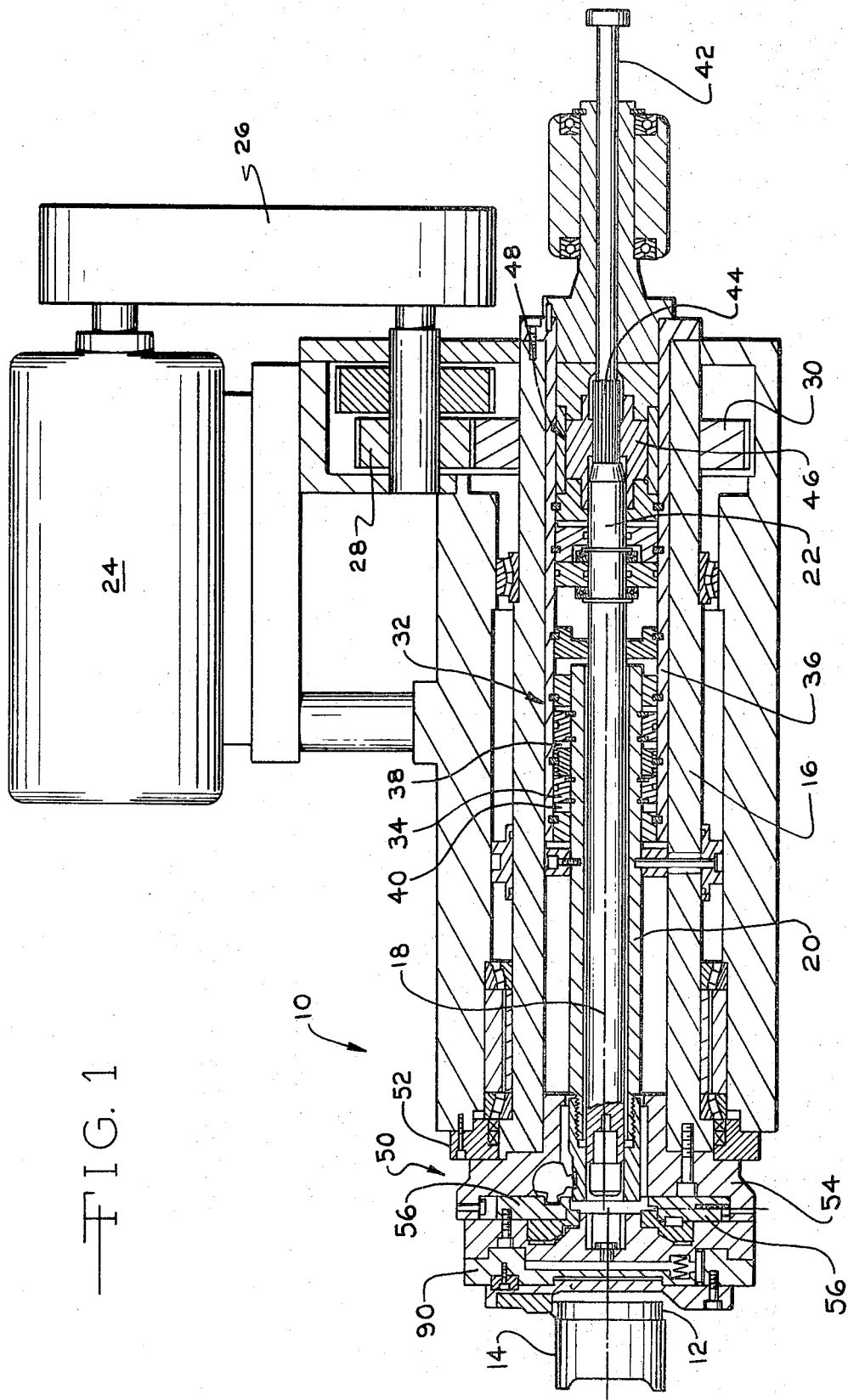
FIG. 1 is a longitudinal sectional view of the machining apparatus of this invention showing the apparatus in position machining a workpiece.

With reference to the drawing, the apparatus of this invention, indicated generally at 10, is shown in FIG. 1 in position machining a surface portion 12 of a piston 14 for an internal combustion engine which is being held in the position shown in FIG. 1 by external work holding apparatus that is not illustrated because it forms no part of the present invention. The apparatus 10 consists of a main spindle 16 having an axis 18, a feed spindle 20 which is arranged coaxially within the tubular main spindle 16 and an index spindle 22 which is in turn arranged coaxially within the feed spindle 20. A drive motor 24 is operable through a belt drive assembly 26 and gears 28 and 30 to rotate the main spindle 16 about the axis 18.

The feed spindle 20 is movable axially of the axis 18 by actuation of a fluid piston and cylinder assembly 32 secured thereto. The assembly 32 includes a plurality of pistons 34 slidably supported in a cylinder 36 and secured to the feed spindle 20. The pistons cooperate with the cylinder 36 to form chambers 38 and 40. When fluid is admitted to the chamber 38, the spindle 20 is moved to the left as viewed in FIG. 1 and when fluid is admitted to the chamber 40, the spindle 20 is moved to the right as viewed in FIG. 1. A suitable pump and valve assembly controls the flow of fluid to the chambers 38 and 40.

The index spindle 22 is movable axially and is also rotatable. In response to the application of an axial force to an extension 42 thereof, the index spindle 22 is movable between the withdrawn position shown in FIG. 1 and an inner position to the left of the position shown in FIG. 1. Intermediate its ends, the index spindle 22 is formed with a spline 44 to which are secured vanes 46 for a fluid actuated vane motor 48 which is operable on supply of fluid thereto to rotate the index spindle 22 in opposite directions through 45° index angles for a purpose to appear presently.

A cross slide assembly 50 is secured to a flange 52 on the forward end of the main spindle 16. The assembly 50 consists of a body 54 secured to the flange 52 and a cross slide member 56 which is formed with a through opening 57 intermediate its ends and is movable transversely of the axis 18 between the inner and outer positions shown in FIGS. 1 and 2, respectively. A feed wheel 58, rotatably mounted on the body 54, has a first tooth 62 engaged in a notch 64 in the feed spindle 20 and a second tooth 66 engaged in a notch 68 in the cross slide member 56. Thus, when fluid is directed to the piston and cylinder assembly 32 so as to move the feed spindle 20 to the right as viewed in FIG. 1, the drive wheel 58 is rotated so as to move the cross slide member 56 inwardly from the position shown in FIG. 2.

Figure 2:
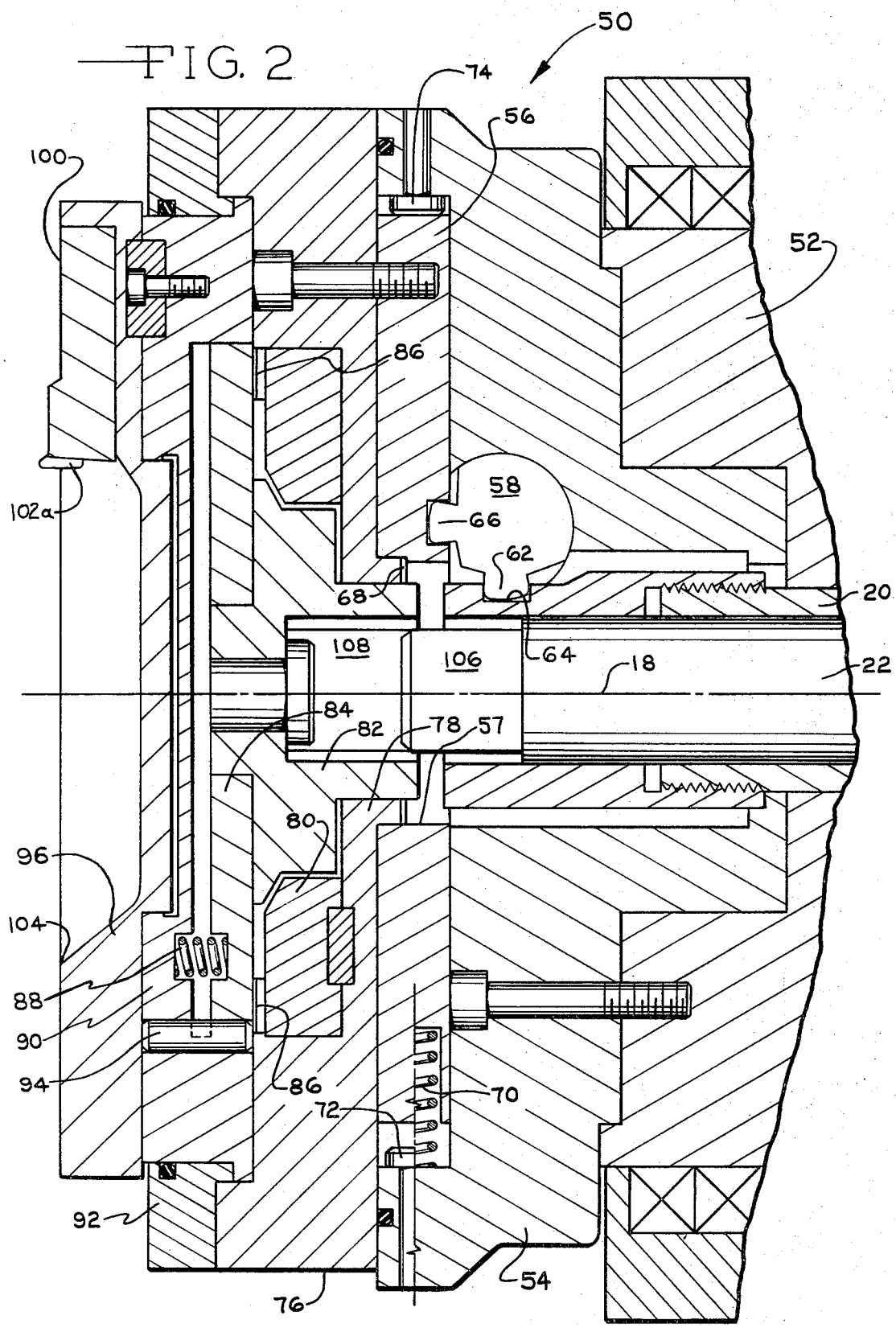
FIG. 2 is an enlarged fragmentary view of a portion of the apparatus shown in FIG. 1 showing the apparatus in position between workpiece machining operations.

Conversely, when the cylinder assembly 32 is operated so as to move the spindle 20 to the left as viewed in FIG. 1, the cross slide 56 is moved outwardly from the position shown in FIG. 1 toward the position shown in FIG. 2. An anti-backlash spring 70 extends between a stop 72 and the inner end of cross slide 56 so as to normally urge the slide 56 toward its outer position shown in FIG. 2. The extreme outer position of the cross slide member 56 is defined by its engagement with a stop 74. The cross slide assembly 50 also includes a block member 76 having a flanged center 78 telescoped within the cross slide opening 57 so that the member 76 moves with the cross slide 56. An annular toothed clutch member 80 is mounted on the block member 76 so that it also moves with the cross slide member 56.

An annular index body 82 is telescopically retained within the block member 76 for movement therewith and has mounted thereon a second toothed clutch member 84. The clutch members 80 and 84 have co-acting teeth 86 which are urged into driving engagement with each other by springs 88, only one of which is shown, extending between a tool head mounting member 90 and the clutch member 84. The tool head mounting member 90 is secured to the block member 76 by a mounting ring 92. Pins 94, only one of which is shown, are carried by the tool head mounting member 90 and extend into sliding engagement with the clutch member 84 so as to prevent the clutch member 84 from rotating relative to the tool head mounting member 90 but permit the clutch member 84 to move away from the clutch member 80 against the pressure of the springs 88. Such movement will disengage the teeth 86 enough to permit the index member 82 to rotate relative to the cross slide member 56, for a purpose to appear presently.

Figure 3:
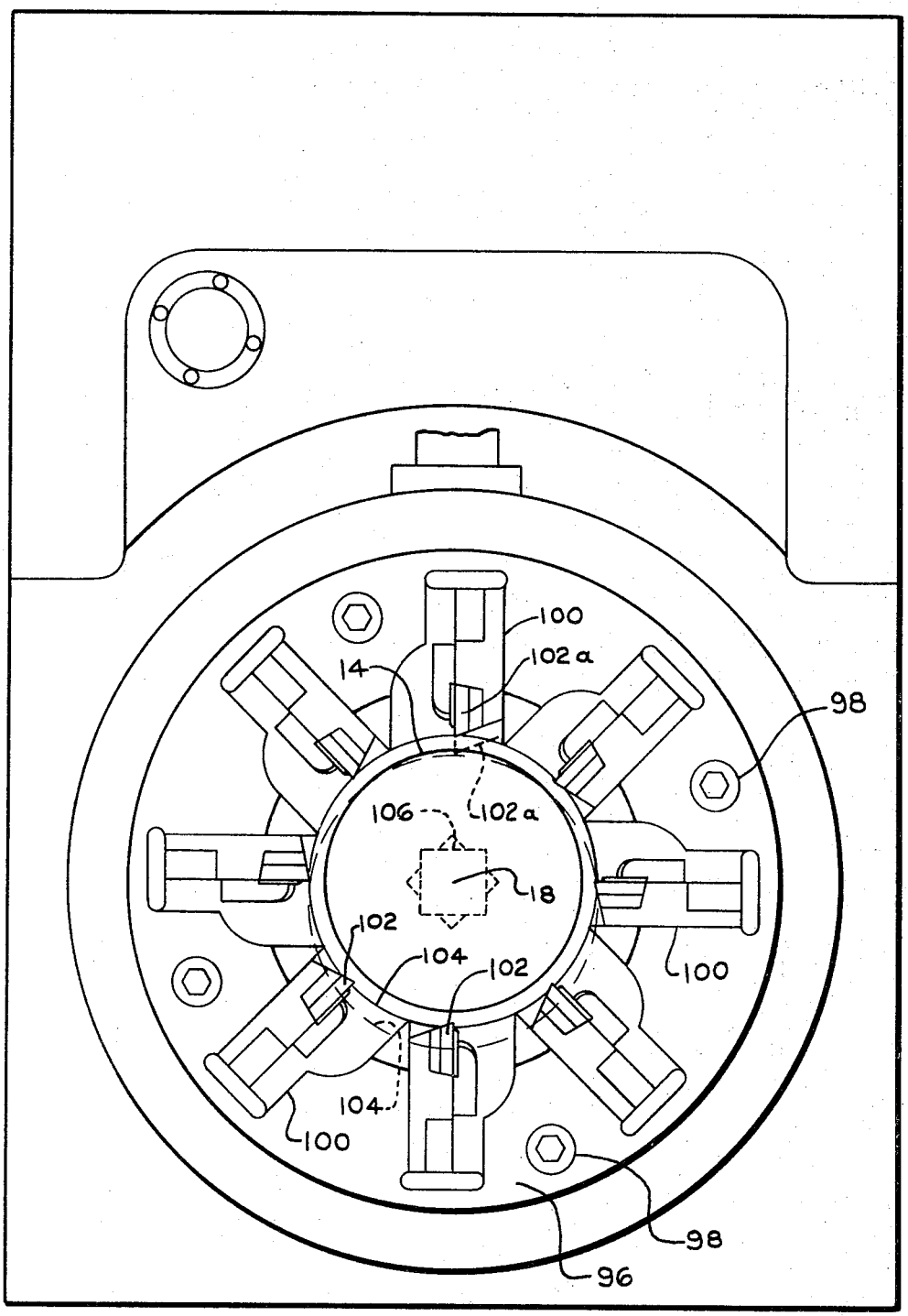
FIG. 3 is an enlarged end view of the apparatus shown in FIG. 1.

A tool head 96 (FIGS. 2 and 3) is removably secured by a plurality of bolts 98 to the tool head mounting member 90. Tool cartridge assemblies 100 are removably mounted on the tool head 96 and support a plurality of cutting tools 102. The tools 102 are arranged in a circular formation extending about the axis 18 in a concentric relation with a central cavity 104 formed in the tool head 96. In the position of the tool head 96 shown in FIG. 3, the cavity 104 is concentric with the axis 18 and the tools 102 are in a clearance relation with a workpiece 14 in centered position on the axis 18. During machining, the tool head 96 is progressively moved in a downward direction as viewed in FIG. 3, even though it is to be understood that the tool head 96 is rotating at this time, so as to move the tool indicated at 102a radially inwardly of the axis 18 so that the cavity 104 becomes eccentric with respect to the axis 18, as shown in broken lines in FIG. 3. When the cavity 104 is eccentric, it is apparent that the circular formation of the tools 102 is also eccentric with respect to the axis 18.

In the operation of the apparatus 10, assume that the tools 102 are in concentric positions with respect to the axis 18 and that the cross slide member 56 is in its outer position shown in FIG. 2. The workpiece 14 is moved into a position concentric with the axis 18 and in a clearance relation with the tools 102 as shown in FIG. 1. The motor 24 is operated to rotate the main spindle 16 so that the tools 102 rotate about the workpiece 14. The feed spindle 20 is operated to move the cross slide member 56 inwardly toward the position shown in FIG. 1 so that the tool 102a is moved radially inwardly into machining engagement with the workpiece 14. When machining is completed, the spindle 20 is operated in a reverse direction to return the tools 102 to concentric positions with respect to the axis 18, the workpiece is withdrawn and replaced by another workpiece 14. The above cycle is then repeated until the tool 102a becomes worn.

At such time, and with the tool 102a in its retracted position shown in full lines in FIG. 2, rotation of the main spindle is discontinued, the index spindle 22 is moved forwardly so that a square head 106 thereon is moved into interfitting driving engagement with an eight point serrated socket 108 formed in the index body 82. The vane motor 48 is then operated to rotate the shaft 22 and consequently the index body 82 and the tool head 96 through an angle of 45° so as to position a tool 102 adjacent the tool 102a in a position previously occupied by the tool 102a. The clutch member 84 will rotate relative to the clutch member 80 with the teeth 86 on the member 84 riding above the teeth 86 on the member 80 against the pressure of the springs 88. The index spindle 82 is then moved in a reverse direction so as to withdraw the head 106 from the socket 108 and the above-described cycle of machining operation is repeated until the second tool becomes worn.

It should also be appreciated that the apparatus 10 is capable of adaptation to machining situations in which the tools 102 are not identical and adjacent tools are used for different machining purposes on the same workpiece. In this environment the apparatus 10 has the advantage of being able to perform multiple machining operations at each station, thus reducing the total number of stations required.

What is claimed is:

1. Machining apparatus comprising a main spindle having an axis, a tool holding head movably mounted on said spindle, a plurality of tools mounted on said head at positions spaced radially outwardly from said axis, means for imparting translatory movement to said head in a direction to provide for movement of one of said tools radially inwardly of said axis, and means for rotating said head so as to index another one of said tools into the position previously occupied by said one tool.

2. Machining apparatus according to claim 1 wherein said tools are arranged in a generally circular formation on said head and wherein translatory movement of said head is effective to move said tools between substantially concentric and eccentric positions relative to said axis.

3. Machining apparatus according to claim 2 wherein said tools in said concentric position of said formation are spaced apart a distance to accommodate a cylindrical workpiece intended for said apparatus and positioned in a concentric relation with said axis, said workpiece being of a sufficiently smaller diameter than said circular formation to provide for a clearance relation between said tools and said workpiece whereby on movement of said head to provide for movement of one of said tools radially inwardly of said axis, said one tool is movable into machining engagement with said workpiece.

4. Apparatus according to claim 1 wherein said means for imparting translatory movement to said tool head comprises a cross slide mounted on said spindle for movement in a direction radially of said axis, and means connecting said cross slide to said tool head.

5. Apparatus according to claim 4 wherein said means connecting said cross slide to said tool head includes clutch means enabling rotational movement of said tool head relative to said slide to index said tools.

6. Apparatus according to claim 4 further including a tool feeding spindle mounted for movement axially of said main spindle, and drive wheel means actuated by axial movement of said feed spindle for moving said cross slide radially of said axis.

7. Apparatus according to claim 1 wherein said means for rotating said head comprises an index spindle mounted for movement axially of said main spindle, an index body connected to said tool head, and coacting drive means on said index spindle and said index body movable into and out of engagement in response to said axial movement of said index spindle, whereby rotation of said index spindle is operable to provide for rotation of said index body and said tool head to index said tools on said head.

8. Apparatus according to claim 7 further including a cross slide assembly mounted on said main spindle and movable radially of said axis, means engaging said index body providing for movement thereof in response to movement of said cross slide assembly, and clutch means mounted on and extending between said index body and said cross slide assembly enabling relative rotational movement therebetween during indexing of said tools.

9. Apparatus according to claim 8 wherein said clutch means comprises a pair of facing members extending about said axis, each of said members having teeth disposed in a plane that is generally perpendicular to said axis, and spring means urging said teeth into engaged positions.

10. Machining apparatus comprising a main spindle having an axis, a feed spindle mounted coaxially within said main spindle, an index spindle mounted coaxially within said feed spindle, a cross slide assembly secured to said main spindle, said assembly including a cross slide member movable radially of said spindle axis, an index body, clutch means mounting said body on said cross slide assembly so that said body is rotatable about said axis relative to said cross slide assembly, a tool head mounting member mounted on said index body, a tool head having a plurality of tools mounted thereon and arranged in a circular formation thereon, means mounting said tool head on said tool head mounting member, said tools being movable in response to actuation of said cross slide between positions in which said formation is substantially concentric and eccentric with respect to said axis.

11. Apparatus according to claim 10 further including spring means extending between said tool head mounting member and said index body yieldably maintaining said clutch means in operative engagement so that said cross slide assembly and said index body rotate together.

12. Apparatus according to claim 10 further including a toothed wheel movably mounted on said cross slide assembly and engaged with said spindle and said cross slide member so that axial movement of said feed spindle causes radial movement of said cross slide.

13. Apparatus according to claim 12 further including coacting means on said index spindle and said index body enabling axial movement of said index spindle into driving engagement with said index body so that in response to rotation of said index spindle, said index body is rotatable relative to said cross slide assembly to thereby index said tools.

* * * * *